US008958394B2

(12) United States Patent
Xu et al.

(10) Patent No.: US 8,958,394 B2
(45) Date of Patent: *Feb. 17, 2015

(54) METHOD AND SYSTEM FOR OPERATING A MULTI-USER MULTIPLE-INPUT MULTIPLE OUTPUT (MU-MIMO) WIRELESS COMMUNICATIONS SYSTEM

(75) Inventors: Kai Xu, Beijing (CN); Chen Zixiong, Beijing (CN); Ni Ma, Shanghai (CN); Kai Sun, Beijing (CN); Bei Zhou, Beijing (CN); Ying Wang, Beijing (CN); Ping Zhang, Beijing (CN)

(73) Assignee: STMicroelectronics International N.V., Amsterdam (NL)

( * ) Notice: Subject to any disclaimer, the term of this patent is extended or adjusted under 35 U.S.C. 154(b) by 916 days.

This patent is subject to a terminal disclaimer.

(21) Appl. No.: 13/108,109

(22) Filed: May 16, 2011

(65) Prior Publication Data

US 2011/0211485 A1    Sep. 1, 2011

Related U.S. Application Data

(63) Continuation of application No. 12/452,067, filed on Apr. 19, 2010, now Pat. No. 7,944,906.

(51) Int. Cl.
*H04W 4/00* (2009.01)
*H04B 17/00* (2006.01)
(Continued)

(52) U.S. Cl.
CPC .......... *H04B 17/0062* (2013.01); *H04B 7/0615* (2013.01); *H04L 1/0026* (2013.01); *H04L 1/0625* (2013.01); *H04L 5/006* (2013.01)
USPC ....................................... 370/332; 370/310.2

(58) Field of Classification Search
CPC .. H04B 17/0062; H04B 7/0615; H04L 5/006; H04L 1/0026; H04L 1/0625
USPC .............. 370/310.2, 328, 338, 332, 341, 349, 370/395.4
See application file for complete search history.

(56) References Cited

U.S. PATENT DOCUMENTS

| 8,626,104 B2 * | 1/2014 | Huang et al. ................... 455/310 |
| 2004/0066754 A1 * | 4/2004 | Hottinen ....................... 370/252 |

(Continued)

FOREIGN PATENT DOCUMENTS

| JP | 2007526692 A | 9/2007 |
| JP | 2009516942 A | 4/2009 |

(Continued)

OTHER PUBLICATIONS

International Search Report dated Jan. 16, 2009 in connection with PCT Application No. PCT/IB2008/052353.

(Continued)

*Primary Examiner* — Brenda H Pham
(74) *Attorney, Agent, or Firm* — Gardere Wynne Sewell LLP

(57) ABSTRACT

A technique for operating a wireless communications system that supports multi-user multiple-input multiple-output (MU-MIMO) communications between a base station and multiple mobile stations involves generating inter-cell interference information at the mobile stations and providing the inter-cell interference information to the base station. The base station uses the inter-cell interference information to calculate channel quality indicators (CQIs) and then makes scheduling decisions in response to the CQIs. Data is transmitted from the base station to the mobile stations according to the scheduling decisions.

9 Claims, 5 Drawing Sheets

(51) Int. Cl.
  *H04B 7/06* (2006.01)
  *H04L 1/00* (2006.01)
  *H04L 1/06* (2006.01)
  *H04L 5/00* (2006.01)

(56) References Cited

U.S. PATENT DOCUMENTS

| | | | |
|---|---|---|---|
| 2005/0043031 A1* | 2/2005 | Cho et al. | 455/450 |
| 2005/0090244 A1* | 4/2005 | Ammi et al. | 455/423 |
| 2006/0233131 A1 | 10/2006 | Gore et al. | |
| 2007/0082619 A1* | 4/2007 | Zhang et al. | 455/69 |
| 2007/0082620 A1* | 4/2007 | Zhang et al. | 455/69 |
| 2007/0183380 A1 | 8/2007 | Rensburg et al. | |
| 2008/0025336 A1 | 1/2008 | Cho et al. | |
| 2008/0101498 A1* | 5/2008 | Han et al. | 375/267 |
| 2008/0165875 A1* | 7/2008 | Mundarath et al. | 375/262 |
| 2009/0316802 A1 | 12/2009 | Tong et al. | |
| 2010/0296591 A1 | 11/2010 | Xu et al. | |

FOREIGN PATENT DOCUMENTS

| | | |
|---|---|---|
| WO | 2005088870 A1 | 9/2005 |
| WO | 2007051208 A2 | 5/2007 |

OTHER PUBLICATIONS

Written Opinion of the International Searching Authority dated Jan. 16, 2009 in connection with PCT Application No. PCT/IB2008/052353.

Rami Abu-alhiga, et al., "Implicit Pilot-Borne Interference Feedback for Multiuser MIMO TDD Systems", 2008 IEEE, p. 334-338.

Francois Horlin, et al., "MU-MIMO Channel Adapted Precoding for MAI/ISI-Free Uplink Burst Transmission", IEEE Transactions on Communications, vol. 52, No. 1, Jan. 2004, p. 100-109.

Yoshitaka Hara, et al., "Spatial Scheduling Using Partial CSI Reporting in Multiuser MIMO Systems", Vehicular Technology Conference, Apr. 1, 2007, IEEE, 5 pages.

Yoshitaka Hara, et al., Pilot-based CSI Feedback in TDD/MIMO Systems with Cochannel Interference, 2006 IEEE, 5 pages.

Yoshitaka Hara, et al., Pilot-based Channel Quality Reporting for OFDMA/TDD Systems with Cochannel Interference, 2006 IEEE, 5 pages.

Hara et al. "Pilot-Based Feedback in TDD/MIMO System with Cochannel Interference." Vehicular Technology Conference, U.S.A., IEEE, Sep. 1, 2006, pp. 1-5.

* cited by examiner

METHOD AND SYSTEM FOR OPERATING A MULTI-USER MULTIPLE-INPUT MULTIPLE OUTPUT (MU-MIMO) WIRELESS COMMUNICATIONS SYSTEM

CROSS-REFERENCE TO RELATED APPLICATIONS

This application is a continuation of U.S. patent application Ser. No. 12/452,067, filed Apr. 19, 2010, now U.S. Pat. No. 7,944,906 entitled "METHOD AND SYSTEM FOR OPERATING A MULTI-USER MULTIPLE-INPUT MULTIPLE OUTPUT (MU-MIMO) WIRELESS COMMUNICATIONS SYSTEM." U.S. patent application Ser. No. 12/452 067 is assigned to the assigned of the present application and is incorporated by reference into this disclosure as if fully set forth herein. This disclosure hereby claims priority under 35 U.S.C. §120 to U.S. patent application Ser. No. 12/452,067.

FIELD OF THE INVENTION

The invention relates generally to wireless communications systems, and more particularly, to managing channel quality indicators in a multi-user multiple-input multiple-output wireless communications network.

BACKGROUND OF THE INVENTION

The 3rd Generation Partnership Project (3GPP) was established to produce globally applicable technical specifications and technical reports for a 3rd generation mobile system based on evolved Global System for Mobile communications (GSM) core networks and the radio access technologies that they support (i.e., Universal Terrestrial Radio Access (UTRA) in both Frequency Division Duplex (FDD) and Time Division Duplex (TDD) modes). The scope was subsequently amended to include the maintenance and development of the GSM technical specifications and technical reports including evolved radio access technologies (e.g., General Packet Radio Service (GPRS) and Enhanced Data rates for GSM Evolution (EDGE)).

In the 3GPP Long Term Evolution (LTE) specification, when operating in multi-user multiple-input multiple-output (MU-MIMO) mode, the scheduler of an evolved Node B (eNB) needs channel quality indicators (CQIs) from the multiple different user equipments (UEs) to make scheduling decisions. Conventionally, CQIs are generated at the UEs and transmitted to the eNB. When a wireless system is operated in single-user multiple-input multiple-output (SU-MIMO) mode, the CQIs can be accurately calculated by the UEs because the UEs have all of the information necessary to calculate the CQIs, which includes the equivalent channel matrix, the usage scheme of each spatial sub-channel, and the inter-cell interference plus additive noise. However, when operating in MU-MIMO mode, the UEs do not necessarily know the usage scheme (pre-coding) that will be used in the next transmission time interval (TTI) for each spatial sub-channel. In MU-MIMO mode, different spatial sub-channel usage schemes will result in different intra-cell interference and consequently different CQIs. In order to account for the different spatial sub-channel usage schemes that could be used and to take full advantage of multi-user scheduling, the UE would need to calculate different CQIs for each different spatial sub-channel usage scheme and then provide the different CQIs to the eNB through uplink signaling. A drawback to calculating multiple different CQIs at each UE and transmitting the multiple different CQIs to the eNB is that these operations consume valuable UE processing and uplink signaling resources.

SUMMARY OF THE INVENTION

A technique for operating a wireless communications system that supports MU-MIMO communications between a base station and multiple mobile stations involves generating inter-cell interference information at the mobile stations and providing the inter-cell interference information to the base station. The base station uses the inter-cell interference information to calculate CQIs and then makes scheduling decisions in response to the CQIs. Data is transmitted from the base station to the mobile stations according to the scheduling decisions.

In an embodiment in accordance with the invention, instead of calculating a variety of CQIs at each UE, inter-cell interference information is generated at the UEs and transmitted to the eNB. At the eNB, CQIs are calculated for the UEs using the eNB's knowledge of the equivalent channel matrix and the usage scheme of each spatial sub-channel along with the inter-cell interference information that is transmitted from the UEs. Because the eNB has the inter-cell interference information from the UEs along with the equivalent channel matrix and the usage scheme of each spatial sub-channel, the calculated CQIs accurately reflect the conditions at the UEs. The calculated CQIs are then used to make scheduling decisions at the eNB and data is transmitted between the eNB and the UEs according to the scheduling decisions. Calculating the CQIs at the eNB instead of at the UEs avoids the need to have the UE calculate multiple different CQIs and avoids the need to burden the uplink channels with carrying those CQIs to the eNB.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
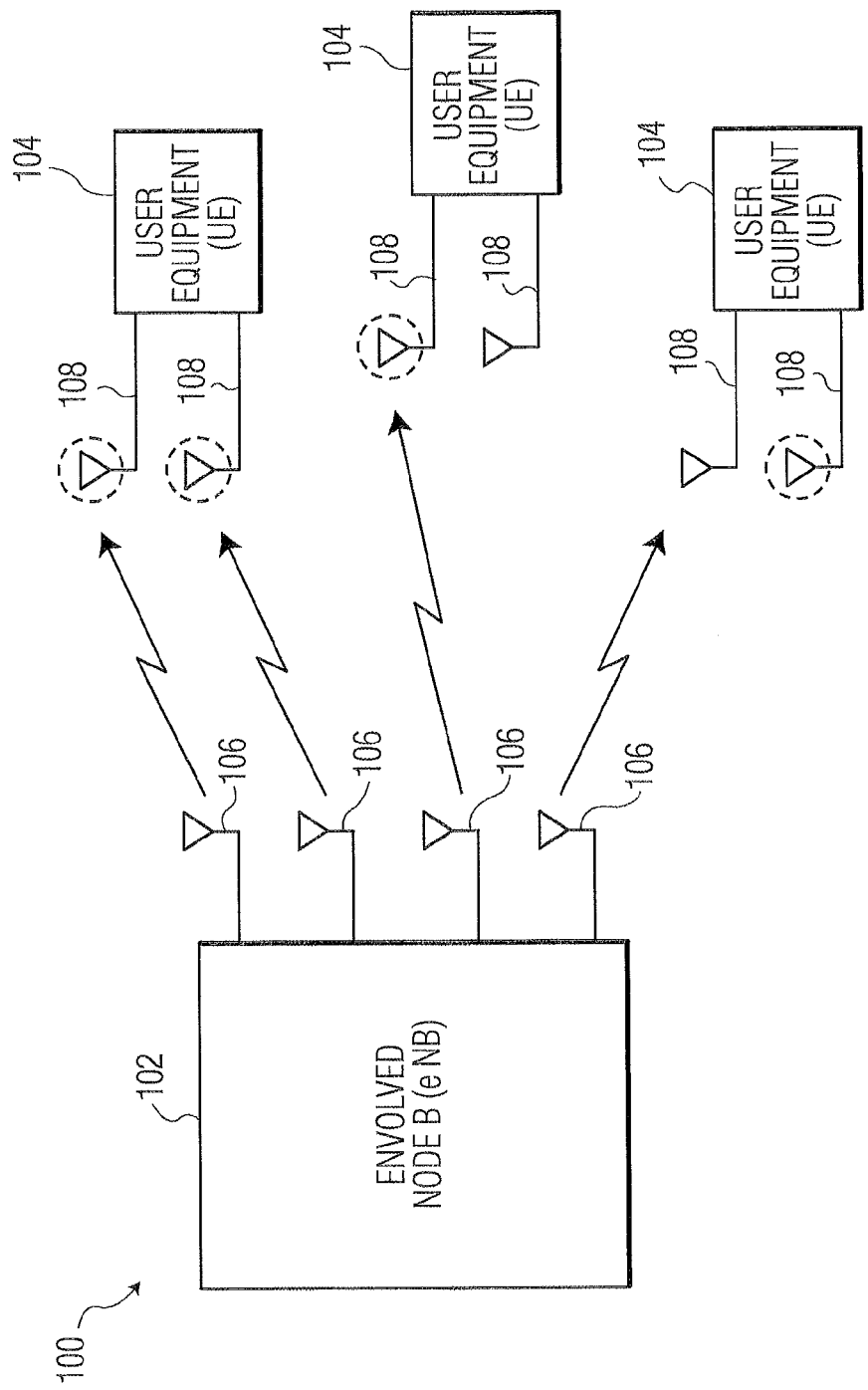
FIG. 1 depicts a wireless communications system that supports MU-MIMO communications between a base station and multiple mobile stations.

Multi-user multiple-input multiple-output (MU-MIMO) is an advanced spatial multiplexing technique for downlink transmission. FIG. 1 depicts a wireless communications system 100 that includes a base station 102 (referred to herein as an evolved Node B (eNB)) and multiple mobile stations 104 (referred to herein as user equipments (UEs)). The wireless communications system is operated in MU-MIMO mode using time division duplexing (TDD). In the embodiment of FIG. 1, the eNB is a wireless communications base station that supports MU-MIMO operation as specified in the 3GPP Long Term Evolution (LTE) specification. The eNB includes four antennas 106 although the eNB can include more than four antennas. In the embodiment of FIG. 1, the UEs are wireless communications mobile stations that support MU-MIMO operation as specified in the 3GPP LTE specification. Each of the UEs has two antennas 108, although the UEs are not limited to two antennas (e.g., the UEs can include only one antenna or more than two antennas).

In a MU-MIMO wireless communications system that includes M independently encoded data streams to be transmitted from an eNB to at most M UEs, the data symbols to be transmitted at arbitrary time epoch can be expressed as $x=[x_1 \ x_2 \ldots x_M]^T$, where $\Box^T$ is the vector transpose. A channel that exists between a transmit antenna and a receive antenna is denoted by an $M_r \times M_t$ complex matrix H, where, $M_t$ is the transmit antenna number and $M_r$ is the receive antenna number. The $M_r$ receive antennas are distributed among M UEs and each UE can be equipped with a single antenna or multiple antennas. Each entity of H denoted by $h_{ij}$ represents the channel gain between receive antenna i and transmit antenna j. In a wireless communications system, such as the wireless communications system 100, which operates in MU-MIMO mode, the transmitter multiplies the data symbol vector x according to a pre-coding matrix E, which is an $M_t \times M$ matrix. The general mathematical representation of a wireless communications system operating in MU-MIMO mode can be expressed as:

$$y = HEx + z \quad (1)$$

Where, $y=[y_1 \ y_2 \ldots y_{M_r}]$ is the signal vector at the receiving antennas of the UEs and z is the inter-cell interference plus additive noise, where the inter-cell interference plus additive noise is referred to herein simply as inter-cell interference. In addition, the pre-coding matrix is usually expressed in column format as $E=[e_1 \ e_2 \ldots e_k \ldots e_M]$, where $e_k(k)=1, 2, \ldots M)$ is an $M_t \times 1$ column vector and each column in E is referred to as a "codeword." Further, HE can be expressed as $H'=[h'_1 \ h'_2 \ h'_3 \ldots]$ and is referred to as the equivalent channel matrix. The columns of H' are referred to as spatial sub-channels since they are the actual vector channels that carry the user data.

When wireless communications systems use channel-dependent scheduling to exploit multi-user diversity, a scheduler at the eNB needs to know the channel quality indicator (CQI) of each UE in advance. In the 3GPP specifications, the CQI is expressed as an integer index. In one embodiment, the CQI is expressed as one of thirty-two CQI indexes with each CQI index having a corresponding signal-to-noise ratio (SINR) threshold. In an embodiment, a CQI is calculated by calculating the SINR of a channel and then selecting the CQI index that has the highest SINR threshold that is less than the to calculated SINR. In order to accurately calculate the CQI of each UE, the eNB needs three pieces of information: 1) the equivalent channel matrix; 2) the usage scheme of each spatial sub-channel (e.g., the size or number of columns, and therefore the specific selection of the preceding matrix, E, from a pre-defined set of candidate pre-coding matrices); and 3) the inter-cell interference plus additive noise at the UE.

In an embodiment, Minimum Mean Square Error (MMSE) is used by the UEs as the baseline receiver detection method. A calculation of the detected signal at a UE is described below for a wireless communications system operating in MU-MIMO mode in which the eNB has four transmit antennas, there are four single-antenna UEs, and all four of the spatial sub-channels are in use. The detected signal can be expressed for a UE, e.g., UE #1, as:

$$y' = h'_1 x_1 + h'_2 x_2 + h'_3 x_3 + h'_4 x_4 + z \quad (2)$$

The CQI of the UE can be calculated as:

$$e = P h'^H_1 K_I^{-1} h'_1 \quad (3)$$

where, $K_I = (Ph'_2 h'^H_2 + Ph'_3 h'^H_3 + ph'_4 h'^H_4 + zz^H) \quad (4)$

In equation (3), e is the calculated SINR of the received signal which can be used to select a CQI index. In equation (4), $K_I$ is a temporary matrix used to calculate the CQI, which is derived from the detection algorithm of the MMSE receiver and P is the transmit power on spatial sub-channel $h'_1$. From equation (4) it can be seen that the calculation of the SINR for a received signal requires knowledge of the equivalent channel matrix, the usage scheme of each spatial sub-channel, and the inter-cell interference plus additive noise. If any one of these parameters is not available, the CQI calculation will not be complete.

In conventional MIMO systems, CQIs are calculated at the UEs and fed back to the eNB. When in SU-MIMO mode, the UEs have access to the equivalent channel matrix, the usage scheme, and the inter-cell interference and therefore the desired CQIs can be calculated at the UEs and fed back to the eNB. However, when in MU-MIMO mode, the usage scheme is known only at the eNB and not provided to the UEs. Therefore, the UEs do not have all of the information necessary to calculate the CQIs. Specifically, since the usage scheme has a significant impact on the inter-cell interference when a wireless communications system is operating in MU-MIMO mode, the calculated CQIs will vary significantly depending on the assumptions that are made with respect to usage schemes for each spatial sub-channel. To better exploit the multi-user diversity, each UE would have to calculate multiple CQIs based on various different usage assumptions and provide those CQIs to the eNB through an uplink channel. The calculation and transmission of multiple CQIs at each UE would significantly impact UE processing and uplink signaling utilization.

In an embodiment in accordance with the invention, instead of calculating a variety of CQIs at each UE, inter-cell interference information is generated at the UEs and transmitted to the eNB. At the eNB, CQIs are calculated for the UEs using the eNB's knowledge of the equivalent channel matrix and the usage scheme of each spatial sub-channel along with the inter-cell interference information that is transmitted from the UEs. Because the eNB has the inter-cell interference information from the UEs along with the equivalent channel matrix and the usage scheme of each spatial sub-channel, the calculated CQIs accurately reflect the conditions at the UEs. The calculated CQIs are used to make scheduling decisions at the eNB and data is transmitted between the eNB and the UEs according to the scheduling decisions. Calculating the CQIs at the eNB instead of at the UEs avoids the need to have the UE calculate multiple different CQIs and avoids the need to burden the uplink channels with carrying those CQIs to the eNB.

Figure 2:
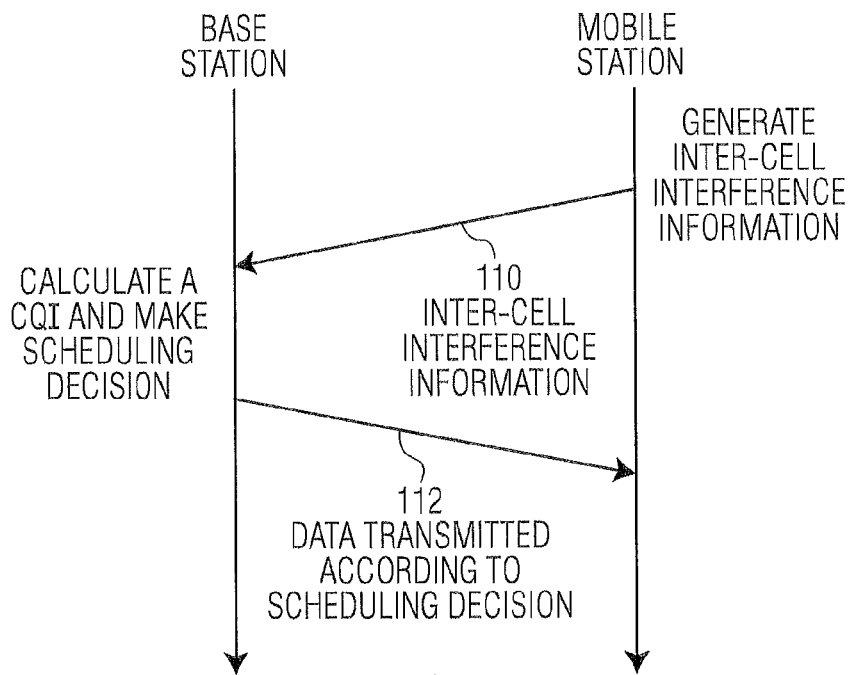
FIG. 2 illustrates a signaling timeline between a base station and a mobile station in a wireless communications system in which CQIs are calculated at the base station instead of at the mobile stations.

FIG. 2 illustrates a signaling timeline between a base station (e.g., eNB 102) and a mobile station (e.g., UEs 104) in a wireless communications system 100 (FIG. 1) in which CQIs are calculated at the base station instead of at the mobile stations. Referring to FIG. 2, inter-cell interference information 110 is generated at a mobile station and then transmitted from the mobile station to the base station. In an embodiment, the inter-cell interference information includes information about the signals that were received at the UE. The base station uses the inter-cell interference information to calculate a CQI and uses the CQI to make a scheduling decision. In an embodiment, a scheduling decision may involve both scheduling and resource allocation parameters including, for example, the selection of transmission frequencies and spatial sub-channels to use for each UE. Data 112 is then transmitted from the base station to the mobile station according to the scheduling decision.

In an embodiment in accordance with the invention, the inter-cell interference information is provided to the eNB as mean values, standard deviations, and an index. In the case in which a UE has two receive antennas, the inter-cell interference, z, is a 2×1 complex vector that can be expressed as: $[(a+bi)(c+di)]^T$. The expression includes four entries a, b, c, and d, which represent the real and imaginary parts of Z and it can be assumed that both a and b follow Gaussian distribution with a corresponding mean value ($\mu_1$) and a corresponding standard deviation ($\sigma_1$ 2) and that both c and d follow a Gaussian distribution with a corresponding mean value ($\mu_2$) and a corresponding standard deviation ($\sigma_2$ 2). In an embodiment, one out of a group of predefined vectors $N=\{N_0, N_1, \ldots N_{2^K-1}\}$ (referred to herein as a "codebook") is used to represent the inter-cell interference, z, where each vector is a sample of a Gaussian distribution with zero mean and standard deviation equal to one. Table 1 is an example of a codebook for a, b, c, and d in which sixteen different codebook entries are uniquely identified using a 4-bit index.

TABLE 1 codebook design example of z

| Index | $a_i$ | $b_i$ | $c_i$ | $d_i$ |
|---|---|---|---|---|
| 0 | −0.5 | −0.5 | −0.5 | −0.5 |
| 1 | −0.5 | −0.5 | −0.5 | +0.5 |
| 2 | −0.5 | −0.5 | +0.5 | −0.5 |
| 3 | −0.5 | −0.5 | +0.5 | +0.5 |
| 4 | −0.5 | +0.5 | −0.5 | −0.5 |
| 5 | −0.5 | +0.5 | −0.5 | +0.5 |
| 6 | −0.5 | +0.5 | +0.5 | −0.5 |
| 7 | −0.5 | +0.5 | +0.5 | +0.5 |
| 8 | +0.5 | −0.5 | −0.5 | −0.5 |
| 9 | +0.5 | −0.5 | −0.5 | +0.5 |
| 10 | +0.5 | −0.5 | +0.5 | −0.5 |
| 11 | +0.5 | −0.5 | +0.5 | +0.5 |
| 12 | +0.5 | +0.5 | −0.5 | −0.5 |
| 13 | +0.5 | +0.5 | −0.5 | +0.5 |
| 14 | +0.5 | +0.5 | +0.5 | −0.5 |
| 15 | +0.5 | +0.5 | +0.5 | +0.5 |

Referring to Table 1, a 4-bit index of "7" corresponds to the values of: a=−0.5, b=+0.5, c=+0.5, and d=+0.5. The specificity of the codebook is a function of the number of codebook entries. A codebook with more entries and thus finer granularity requires an index with more bits to uniquely identify each entry and a codebook with fewer entries can be represented with an index having fewer bits. The size of the codebook is implementation specific.

In an exemplary operation, each UE calculates the mean value and standard deviation of both of the signals received at its two antennas. In an embodiment, the mean value and standard deviation for each received signal, $\mu_1, \sigma_1^2$ and $\mu_2, \sigma_2^2$, are calculated based on all of the inter-cell interference information measured in a long period (e.g. 1 radio frame). In an embodiment, the mean and standard deviation are both quantized as $m \times 10^{-n}$, where m is represented by three bits and n is represented by three bits. Once calculated, the mean values and standard deviations are transmitted to the eNB for use in calculating CQIs.

In an embodiment, selecting an index from the codebook involves normalizing the inter-cell interference at a particular instant:

$$z=[(a+bi)(c+di)]^T, \text{ to}$$

$$z'=[(a'+b'i)(c'+d'i)]^T,$$

which follows a standard Gaussian distribution (0,1):

$$\begin{cases} a' = \dfrac{a-\mu_1}{\sigma_1} & b' = \dfrac{b-\mu_1}{\sigma_1} \\ c' = \dfrac{c-\mu_2}{\sigma_2} & d' = \dfrac{d-\mu_2}{\sigma_2} \end{cases}$$

The normalized inter-cell interference, z', is then mapped to a nearest vector $N_i$ in the codebook as follows:

$$i^* = \arg\min_{i=0}^{2^K-1} \|z' - N_i\|$$

Once the index is selected from the codebook, it is transmitted to the eNB. In an embodiment, the index is transmitted to the eNB separately from the mean values and standard deviations.

Once the eNB receives the mean values, standard deviations, and the index from a UE as described above, the inter-cell interference, z, can be regenerated at the eNB. In an embodiment, the inter-cell interference is regenerated at the eNB as follows:

$$\begin{cases} a'' = a_{i^*} \times \sigma_1 + \mu_1 & b'' = b_{i^*} \times \sigma_1 + \mu_1 \\ c'' = c_{i^*} \times \sigma_2 + \mu_2 & d'' = d_{i^*} \times \sigma_2 + \mu_2 \end{cases}$$

$$z'' = [a'' + b''i \quad c'' + d''i]^T$$

For example, assuming that index "7" is fed back to the eNB, the inter-cell interference is regenerated according to the following expression:

$$z''=[(\mu_1-0.5\times\sigma_1)+(\mu_1+0.5\times\sigma_1)i(\mu_2+0.5\times\sigma_2)+(\mu_2+0.5\times\sigma_2)i]^T$$

The eNB then uses the regenerated inter-cell interference, z″, to calculate at least one CQI for the corresponding UE. The eNB then uses the calculated CQI(s) to make a scheduling decision. Data is transmitted from the eNB to the UE according to the scheduling decision.

Since the mean values and standard deviations will change at a relatively low frequency, in an embodiment, the mean values and standard deviations for the received signals are provided to the eNB on a relatively long interval, e.g. every 10 radio frames, while the index is provided to the eNB at a relatively short interval, e.g., every TTI which is approximately 10 ms in the LTE TDD Type 1 frame structure.

Figure 3:
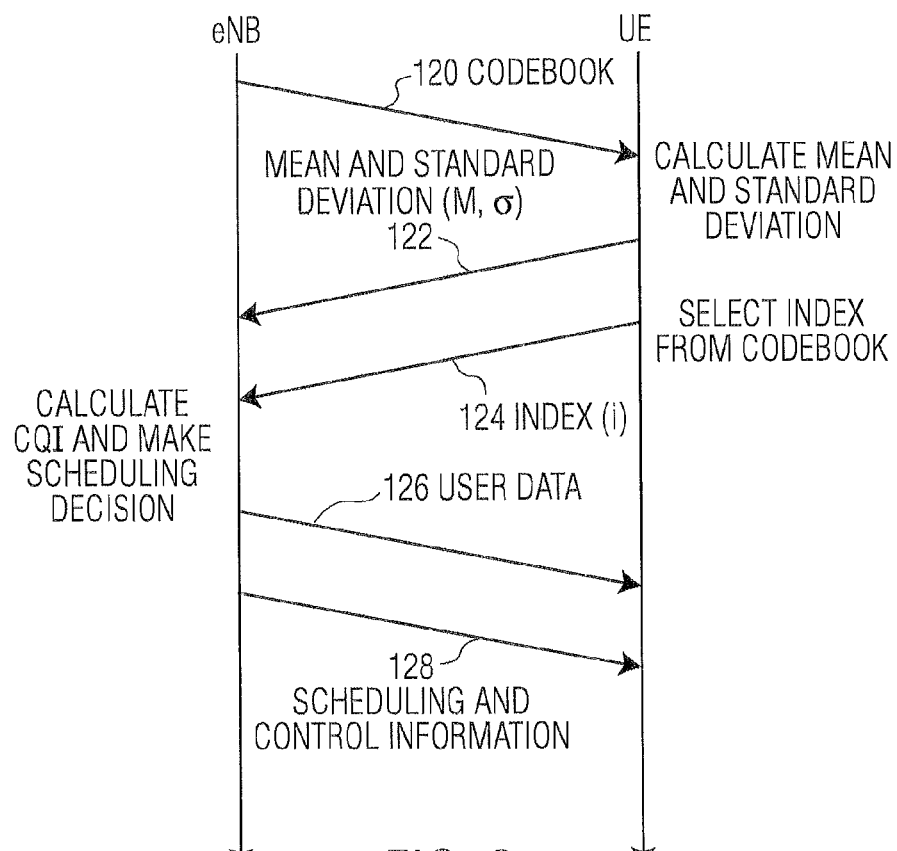
FIG. 3 illustrates a signaling timeline between an eNB and a UE in a wireless communications system in which CQIs are calculated at the eNB using inter-cell interference information from the UE, where the inter-cell interference information is provided to the eNB as mean values, standard deviations, and an index.

FIG. 3 illustrates a signaling timeline between an eNB and a UE in a wireless communications system in which CQIs are calculated at the eNB using inter-cell interference information from the UE, where the inter-cell interference information is provided to the eNB as mean values, standard deviations, and an index. First, the eNB provides the UE with a codebook 120 for use in selecting an index. The codebook could be static or semi-static depending on the application. In an embodiment, the codebook is provided to multiple UEs via a broadcast or common control channel. Next, the UE receives signals from the eNB, measures a characteristic of the received signals (e.g., signal power), and calculates the mean value and standard deviation of each received signal. Additionally, the UE selects an index that represents the measured characteristics of the received signals. The mean values, standard deviations, and index are all transmitted to the eNB. In an embodiment, the mean values and standard deviations 122 are transmitted together at a relatively long period (e.g., one data set every 10 radio frames) and the index, i, 124 is transmitted separately at a relatively short period (e.g., one index every TTI, e.g., 10 ms in the LTE TDD Type 1 frame structure).

The eNB uses the inter-cell interference information, which was provided as mean values, standard deviations, and an index, to calculate a CQI or multiple CQIs under various usage schemes (e.g., $h'_1$ $h'_2$ $h'_3$ ... ). The eNB then uses the CQIs to make a scheduling decision or multiple scheduling decisions and user data 126 is transmitted to the UE according to the scheduling decision(s). In addition to user data, the eNB may also transmit scheduling and control information 128, which is related to the scheduling decision, to the UE.

Figure 4:
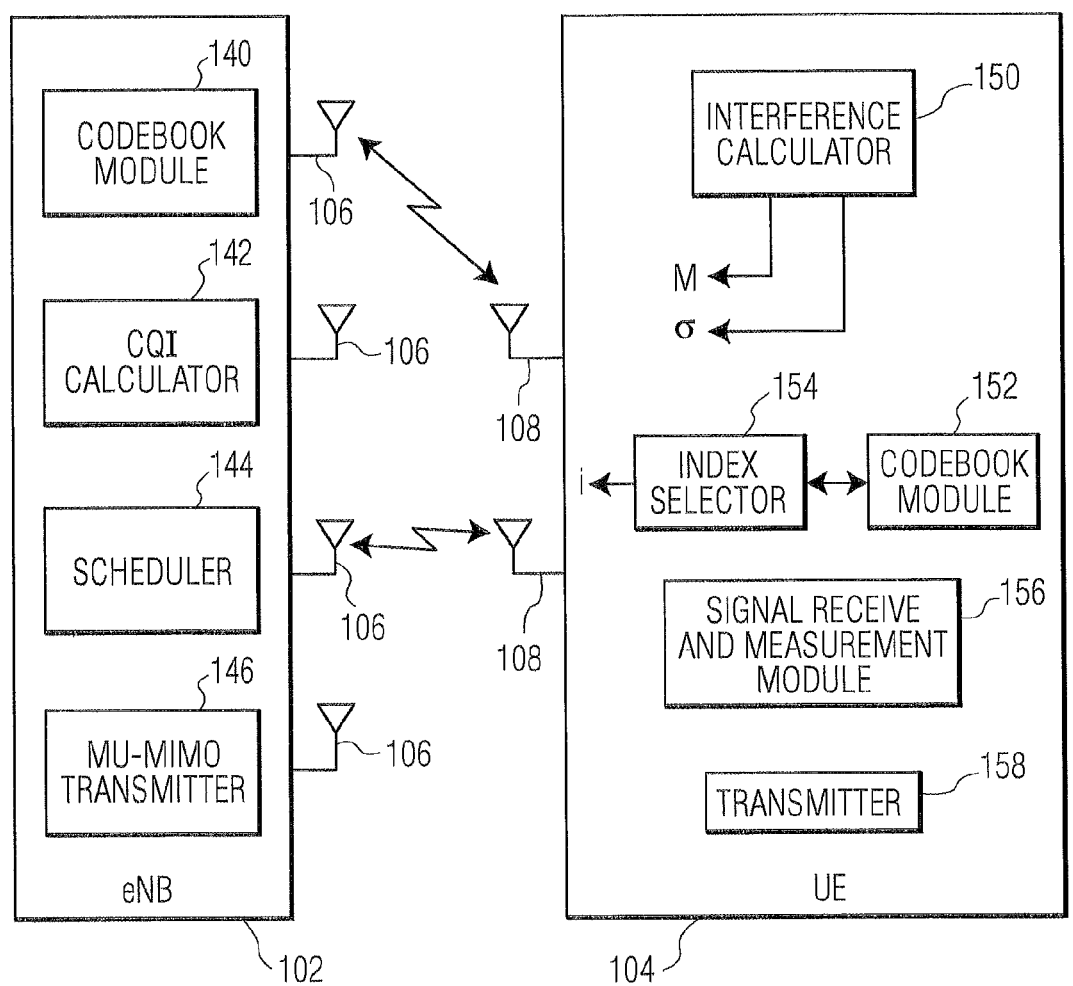
FIG. 4 depicts an eNB and a UE that are configured to operate as described above with reference to FIGS. 2 and 3.

FIG. 4 depicts functional block diagrams of an eNB 102 and a UE 104, which are configured to implement the above-described technique in a MU-MIMO environment. The eNB includes a codebook module 140, a CQI calculator 142, a scheduler 144, and a MU-MIMO transmitter 146. The codebook module is the source of the codebook that is distributed from the eNB to the UE. The CQI calculator calculates CQIs in response to the inter-cell interference information that is received from the UE. The scheduler makes scheduling decisions using the CQIs that are generated by the CQI calculator. The MU-MIMO transmitter transmits information, including the codebook, user data, and scheduling and control information to the UE. The UE includes an interference calculator 150, a codebook module 152, an index selector 154, a signal receive and measurement module 156, and a transmitter 158. The signal receive and measurement module receives and measures signals that are received on the UE's antennas. The interference calculator calculates the mean and standard deviation for the received signals in response to measurement information generated by the signal receive and measurement module. The codebook module stores the codebook and the index selector selects an index from the codebook in response to the received signals. The transmitter transmits the mean values, the standard deviations, and the index to the base station for use in calculating CQIs. Although only one UE is shown for description purposes, more than one UE can be supported by and interact with the eNB. Additionally, although certain functional elements are shown in FIG. 4, the functions associated with the functional elements may be distributed throughout the eNB or the UE. Further, the functional elements may be embodied as hardware, software, firmware, or any combination thereof.

Figure 5:
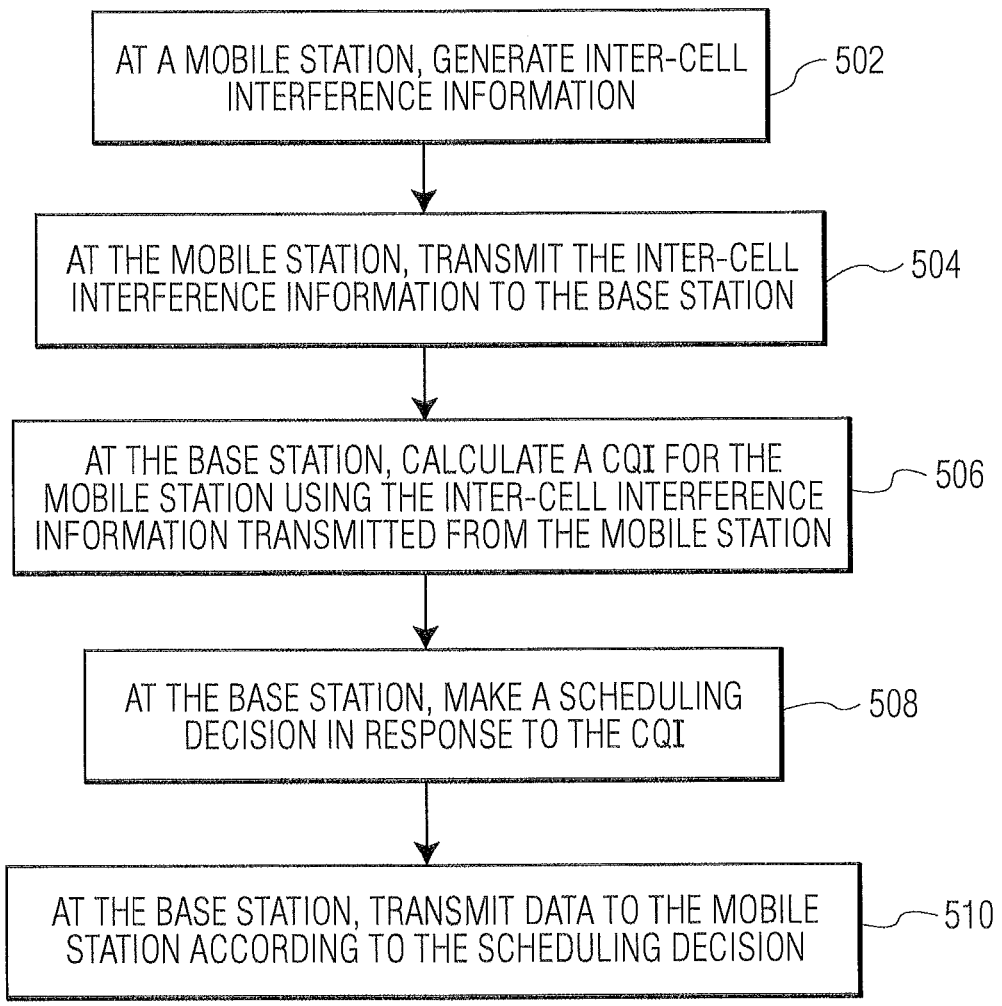
FIG. 5 is a process flow diagram of a method for operating a wireless communications system that supports MU-MIMO communications between a base station and multiple mobile stations.

FIG. 5 is a process flow diagram of a method for operating a wireless communications system that supports MU-MIMO communications between a base station and multiple mobile stations. At block 502, inter-cell interference information is generated at a mobile station. At block 504, the inter-cell interference information is transmitted from the mobile station to the base station. At block 506, a CQI is calculated at the base station for the mobile station using the inter-cell interference information transmitted from the mobile station. At block 508, a scheduling decision is made at the base station in response to the CQI. At block 510, data is transmitted from the base station to the mobile station according to the scheduling decision.

The above-described technique can be implemented in a manner that reduces the amount of uplink signaling that is required to operate a wireless communications system in MU-MIMO mode relative to conventional techniques in which the CQIs are generated at the UEs. For example, in a 4×4 MU-MIMO transmission scheme, the eNB has four transmit antennas and a UE has two receive antennas, resulting in four spatial channels. Using a technique in which the CQIs are generated at the UEs, the resulting feedback signaling overhead can be calculated as indicated in Table 2.

TABLE 2

Conventional CQI feedback overhead

| channel number used for UE#1 | channel number used for other UEs | Un-used channel number | Preferred spatial sub-channel selection bits | MCS bits of each combination | CQI feedback overhead |
|---|---|---|---|---|---|
| 1 | 1 | 2 | 2 | 5 | 7 |
| 1 | 2 | 1 | 2 | 5 | 7 |
| 2 | 1 | 1 | 2*2 | 5 | 9 |
| 2 | 2 | 0 | 2*2 | 5 | 9 |
| Total CQI feedback overhead | | 7 + 7 + 9 + 9 = 32 bits | | | |

As indicated in Table 2, the UE uses two bits to indicate a preferred spatial sub-channel since there are a total of four sub-channels available and if two spatial sub-channels are selected, the corresponding overhead will be 2*2=4 bits. Additionally, five bits are used to indicate the modulation and coding scheme (MCS) selection. Thus, from Table 2 it can be seen that the total CQI feedback overhead is 32 bits in an allocation period, e.g. 10 ms.

Using the technique described above with reference to FIGS. 1-4 to provide inter-cell interference information to the eNB and assuming the mean values and standard deviations are fed back over every 10 radio frames, the overhead related to the mean values and standard deviations is calculated as 2*2*6=24 bits per 100 ms. Furthermore, assuming a codebook that utilizes a 16-bit index that is fed back in every radio frame (10 ms), the average uplink feedback overhead is calculated as: 24/(100/10)+16=18.4 bits per 10 ms. The overhead of 18.4 bits per 10 ms represents over a 42% reduction in overhead as compared to the conventional technique as described with reference to Table 2.

Figure 6:
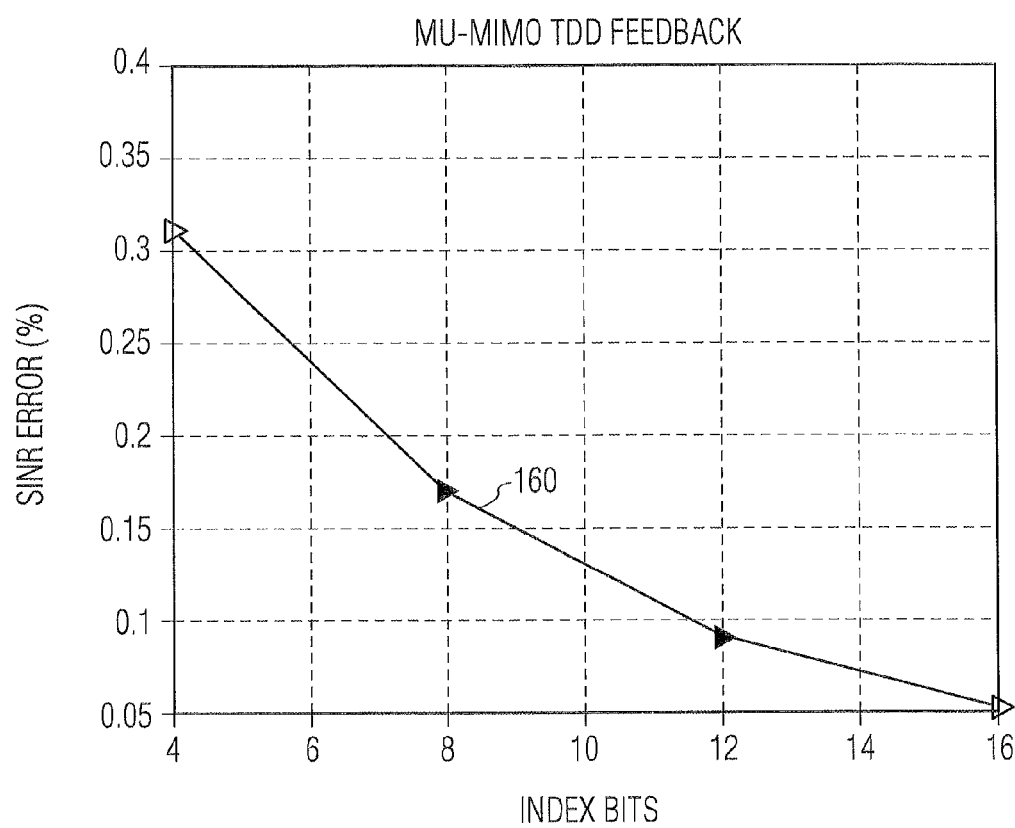
FIG. 6 is a graph of the number of index bits relative to signal to noise error.

The CQI calculation error for the technique described with reference to FIGS. 1-4 is compared to an ideal CQI calculation in the graph of FIG. 6, which plots the number of index bits on the x-axis against the SINR error on the y-axis. In the graph of FIG. 6, the codebook ranges in size from four bits to sixteen bits and the relative linear absolute error between the estimated SINR (in linear units) and the accurate SINR is used as the performance metric. As shown in the graph of FIG. 6, the SINR error 160 is very small when the index is more than about twelve bits. The small error reflected in FIG. 6 will tend to improve the accuracy of MCS selection, and the Block Error Rate (BLER) performance will likely be close to the ideal scheme.

The above-described technique takes advantage of channel reciprocity between the eNB and UEs in the TDD wireless communications system, wherein channel reciprocity involves essentially equivalent channel responses in the uplink and downlink directions.

Although specific embodiments of the invention have been described and illustrated, the invention is not to be limited to the specific forms or arrangements of parts as described and illustrated herein. The invention is limited only by the claims.

The current claims follow. For claims not marked as amended in this response, any difference in the claims below and the previous state of the claims is unintentional and in the nature of a typographical error.

The invention claimed is:

1. A method performed by a mobile station operative in a wireless communication system, the method comprising:
   generating inter-cell interference information, wherein generating the inter-cell interference information comprises calculating a mean value and a standard deviation for multiple signals that are received at the mobile station, making signal measurements at the mobile station, and selecting an index from a codebook in response to the signal measurements, wherein the index is representative of the measured signals, and
   transmitting the inter-cell interference information to a base station for the calculation, at the base station, of a channel quality indicator (CQI) based on the inter-cell interference information, wherein the inter-cell interference information provides to the base station includes the mean value, standard deviation, and the selected index.

2. The method of claim 1 further comprising receiving the codebook from the base station, wherein the codebook defines multiple indexes.

3. The method of claim 1 wherein generating the inter-cell interference information comprises making signal measurements at the mobile station, calculating mean values in response to the signal measurements, calculating standard deviations in response to the signal measurements, and selecting an index from a codebook in response to the signal measurements.

4. The method of claim 3 further comprising providing the mean values and the standard deviations to the base station at an interval that is longer than an interval at which the index is provided to the base station.

5. A method performed by a base station usable in a wireless communications system, comprising:
   receiving inter-cell interference information from at least one mobile station;
   calculating a channel quality indicator (CQI) for a mobile station using the inter-cell interference information received from the mobile station, wherein the CQI is calculated at the base station using equivalent channel matrix information and usage scheme information for spatial sub-channels in addition to the inter-cell interference information that is received from the at least one mobile station;
   making a scheduling decision in response to the CQI; and
   transmitting data to the mobile station according to the scheduling decision.

6. The method of claim 5 further comprising, at the base station, receiving mean values and standard deviations from the mobile station at an interval that is longer than an interval at which an index is provided to the base station.

7. The method of claim 5 further comprising, at the base station, calculating a CQI related to the mobile station for various usage schemes and making a scheduling decision in response to the calculated CQIs.

8. A method performed by a mobile station usable in a wireless communications system, the method comprising:
   receiving and measuring multiple incoming signals;
   generating inter-cell interference information, wherein generating inter-cell interference information comprises calculating a mean value and a standard deviation for the received signals, selecting an index from a codebook in response to the received signals; and
   transmitting the inter-cell interference information to the base station for use in calculating a channel quality indicator (CQI) at the base station, wherein the mean value and the standard deviation are transmitted to the base station at an interval that is longer than an interval at which the index is transmitted to the base station.

9. The method of claim 8 further comprising storing a codebook.

* * * * *